(12) United States Patent
Goldberg

(10) Patent No.: US 9,003,504 B2
(45) Date of Patent: Apr. 7, 2015

(54) REMOTE LOGIN ARRANGEMENT FOR HETEROGENEOUS SYSTEMS USING CENTRALIZED AUTHENTICATION

(75) Inventor: Richard Goldberg, Richmond, VA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/154,752

(22) Filed: Jun. 7, 2011

(65) Prior Publication Data

US 2012/0317630 A1 Dec. 13, 2012

(51) Int. Cl.
*G06F 21/31* (2013.01)
*H04L 9/32* (2006.01)
*H04L 29/06* (2006.01)

(52) U.S. Cl.
CPC .............. *G06F 21/31* (2013.01); *H04L 9/3215* (2013.01); *H04L 63/0884* (2013.01)

(58) Field of Classification Search
CPC .... G06F 21/31; H04L 9/3215; H04L 63/0884
USPC .................................................. 726/2, 5, 7, 3
See application file for complete search history.

(56) References Cited

U.S. PATENT DOCUMENTS 7,219,154 B2 * 5/2007 Blakley et al. ................ 709/229
2002/0112045 A1 * 8/2002 Nirkhe et al. ................ 709/223

* cited by examiner

*Primary Examiner* — Kambiz Zand
*Assistant Examiner* — Ayoub Alata
(74) *Attorney, Agent, or Firm* — Richard J. Gregson

(57) ABSTRACT

Methods and systems for authenticating a remote user across heterogeneous authentication systems are disclosed. One method includes receiving domain user credentials at a first heterogeneous authentication system, and transmitting the domain user credentials from the first heterogeneous authentication system to an authentication interface associated with a second heterogeneous authentication system. The method also includes transmitting the domain user credentials from the second heterogeneous authentication system to a centralized authentication system, and receiving at the authentication interface a validation message from the centralized authentication system, thereby authenticating the user. The method further includes determining a local username at the authentication interface based on the domain user credentials. The method includes using the local username to authenticate the user within the first heterogeneous authentication system.

20 Claims, 6 Drawing Sheets

REMOTE LOGIN ARRANGEMENT FOR HETEROGENEOUS SYSTEMS USING CENTRALIZED AUTHENTICATION

TECHNICAL FIELD

The present disclosure relates generally to management of login credentials; in particular, the present disclosure relates to a remote login arrangement for heterogeneous systems using centralized authentication.

BACKGROUND

Various computing environments and applications require users to provide credentials prior to allowing access to certain functionalities, data, or applications. For example, a user may be required to provide a username and password to be provided access to applications running within the context of an operating system, or to the operating system itself. In this context, an operating system will validate users for each application executing within that operating system. Alternately, a user may provide a domain username and domain password to a domain server, which in turn would manage access to domain resources (e.g., one or more computing systems and/or applications operable within the domain).

In some computing environments, servers or applications may use different security methods or different operating systems, each having different standards and settings for user credentials. These servers or applications could have, for example, a different set of minimum standards related to length and robustness of password strings, or a particular format for username or domain username notation, or different frequencies with which passwords must change.

Difficulties arise when a computing environment includes multiple such heterogeneous, yet interrelated systems having different management or settings for user authentication. Specifically, when one such system requires access to resources of a different system, those systems must be coordinated to allow such access to occur.

In applications or servers having heterogeneous authentication systems, typically a user will either provide credentials for each system separately, or will provide credentials for a first one of those authentication systems, which then stores a set of credentials used by a second authentication system. This second arrangement allows the authentication systems to coordinate and allow the user to access information in both applications or servers with a single login process. However, using the first authentication system to provide access to the second heterogeneous system does not provide reliable access to both systems, since the credentials (e.g., a username or password) for the user on the second heterogeneous system may change without the information stored in the first authentication system being updated.

Inclusion of remote access into such systems only exacerbates these problems. If a user wishes to access a set of computing systems having heterogeneous authentication systems from a remote location, that user typically must use a remote access protocol, such as the lightweight directory access protocol (LDAP). However, if user credentials in any of the heterogeneous authentication systems have changed, that remote access protocol would also not be notified of those changes. Therefore, when user credentials change, remote access would be prevented.

For these and other reasons, improvements are desirable.

SUMMARY

In accordance with the following disclosure, the above and other issues are addressed by the following:

In a first aspect, a method for authenticating a remote user across heterogeneous authentication systems is disclosed. The method includes receiving domain user credentials at a first heterogeneous authentication system, and transmitting the domain user credentials from the first heterogeneous authentication system to an authentication interface associated with a second heterogeneous authentication system. The method also includes transmitting the domain user credentials from the second heterogeneous authentication system to a centralized authentication system, and receiving at the authentication interface a validation message from the centralized authentication system, thereby authenticating the user. The method further includes determining a local username at the authentication interface based on the domain user credentials. The method includes using the local username to authenticate the user within the first heterogeneous authentication system.

In a second aspect, a system for authenticating remote users across heterogeneous authentication systems is disclosed. The system includes a first heterogeneous authentication system configured to control access to a first server application on a server, and a second heterogeneous authentication system configured to control access to an operating system on a server, the server hosting the first server application. The system also includes an authentication interface operable in connection with the second heterogeneous authentication system, the authentication interface configured to communicate with a centralized authentication system operating external to the server. Within the system as disclosed, the first heterogeneous authentication system lacks definition of the user credentials used to access the first server application.

In a third aspect, a computer-implemented method of authenticating a remote user across heterogeneous authentication systems is disclosed. The computer-implemented method includes receiving domain user credentials and local login information at a local authentication system associated with a server application, and transmitting the domain user credentials from the local authentication system associated with a server application to an authentication interface associated with an operating system authentication system, the authentication interface including an application programming interface configured to interface with a domain authentication system. The computer-implemented method further includes transmitting the domain user credentials from the authentication interface to the domain authentication system, and receiving at the authentication interface a validation message from the domain authentication system. The computer-implemented method includes, upon receipt of the validation message, authenticating the domain user credentials at the operating system authentication system, and determining a local username at the authentication interface based on the domain user credentials. The computer-implemented method also includes using the local login information to authenticate the user within the local authentication system associated with the server application.

DETAILED DESCRIPTION

Figure 1:
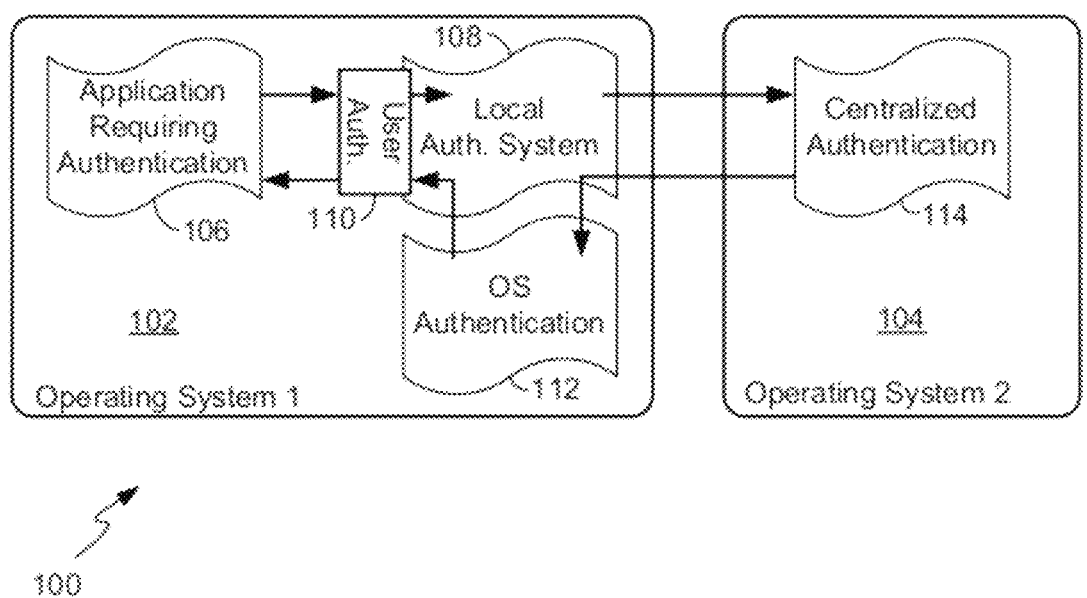
FIG. 1 illustrates a system for authenticating a remote user across heterogeneous authentication systems, according to a possible embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to systems and methods for authenticating users across heterogeneous authentication systems, in particular for supporting authentication of remote users. In various embodiments of the present disclosure, coordination of authentication systems is provided, allowing for centralized (e.g., network-based or domain-level) authentication of users, and allowing those users to access computer-based applications requiring both authentication and access to resources within a system requiring separate authentication requirements. The methods and systems of the present disclosure simplify and streamline domain-based authentication, allowing users with identical domain usernames in different domains to access a local application by allowing "background" assignment of unique local usernames. Furthermore, the methods and systems described herein resolve a possible disconnect between systems when a user's passwords change and access across heterogeneous authentication systems is required.

In the context of the present disclosure, various types of authentication across a network, domain, or commonly-managed set of computing systems are discussed. While the present disclosure relates to use of any type of similar authentication process, the terms "centralized" or "centralized authentication" or analogous terms are used to represent any of a variety of network, domain, or commonly-managed authentication system (e.g. LDAP-based authentication). Additionally, although in some examples user credentials to be used in connection with centralized authentication are discussed as "domain credentials" or a "domain identifier", it is recognized that these terms encompass credentials used to access other centralized authentication systems as well, such as network based authentication systems.

Referring now to FIG. 1, an example system 100 for authenticating a remote user across heterogeneous authentication systems is shown. The system 100 includes a first operating system 102 and a second operating system 104. The first and second operating system 102, 104 operate on one or more computing systems, such as the computing systems described below in connection with FIG. 6. In certain embodiments, the first and second operating systems 102, 104 reside on separate computing systems, and communicate by way of a network connection, or over the Internet. In alternative embodiments, the first and second operating systems 102, 104 can reside on a single computing system. In such embodiments, the first and second operating systems 102, 104 can execute within one or more different virtual environments or on different processors. Other arrangements are possible as well.

The first operating system 102 hosts an application 106 that includes an authentication system incorporated therein. The application 106 can be any of a number of types of productivity based server or client side applications in which user-based security is required. In certain embodiments, the application 106 can be an instance of Business Information Server for OS 2200, provided by Unisys Corporation of Blue Bell, Pa. Other applications requiring localized authentication could be used as well.

A local authorization system 108 can execute within the first operating system 102 as well, and can be configured to provide an interface to one or more additional external authorization systems. The local authorization system 108 provides an application programming interface (API) 110 that offers authentication systems to applications, for example the application 106. In certain embodiments, the local authorization system 108 allows applications incorporating systems capable of communicating with the API 110 to authenticate with a variety of other types of authentication systems, for example possible operating systems on which the applications can operate. In certain embodiments API 110 is configured to contain a plurality of modules, each of which are defined to authenticate a user against one or more different heterogeneous authentication systems. For example, a first API module can be configured for local authentication using the local authorization system 108, and a second API module can be configured for network-level or domain-level authentication. Other modules can be included in the API 110 as well, and can be defined to interface with other types of local or centralized authentication systems.

The first operating system 102 also includes an authentication system 112 associated with the operating system 102 itself, for example to allow access to files or other computer resources managed by that operating system. In certain embodiments, the first operating system 102 can be a Unisys OS 2200 operating system, provided by Unisys Corporation of Blue Bell, Pa. Other operating systems could be used as well.

The second operating system 104 can, in various embodiments, host a centralized authentication system 114, which provide for network- or directory-level authentication of a user. By providing such authentication, the centralized authentication system 114 can grant access to resources across a directory in a network of similarly-controlled systems. In certain embodiments, the second operating system 104 is a Microsoft Windows-based system, provided by Microsoft Corporation of Redmond, Wash. In such embodiments, the centralized authentication system 114 can be configured to operate using any of a variety of types of services, such as an Active Directory service from Microsoft Corporation of Redmond, Wash. The various other directory services, including LDAP access, or other types of centralized domain-based username and password management systems could be implemented.

Although in typical arrangements, a centralized authentication system 114 can authenticate a user within a particular network, in the case of heterogeneous authentication systems there are situations where the centralized authentication system 114 is not straightforwardly used on a stand-alone basis. For example, there may be circumstances where a remote user wishes to directly access an application (e.g., application 106) requiring local authentication and access to resources in a system such as operating system 102, but that application 106 does not support such directory-level authentication. In such circumstances, simply using a centralized authentication system is insufficient, because the local authentication information used by either the application 106 or operating system 102 may change without being tracked by the directory authentication system 114. In such circumstances, an arrangement such as illustrated in FIGS. 2-3 can be implemented in which use of local authentication in conjunction with the centralized authentication system 114 can be accomplished.

Figure 2:
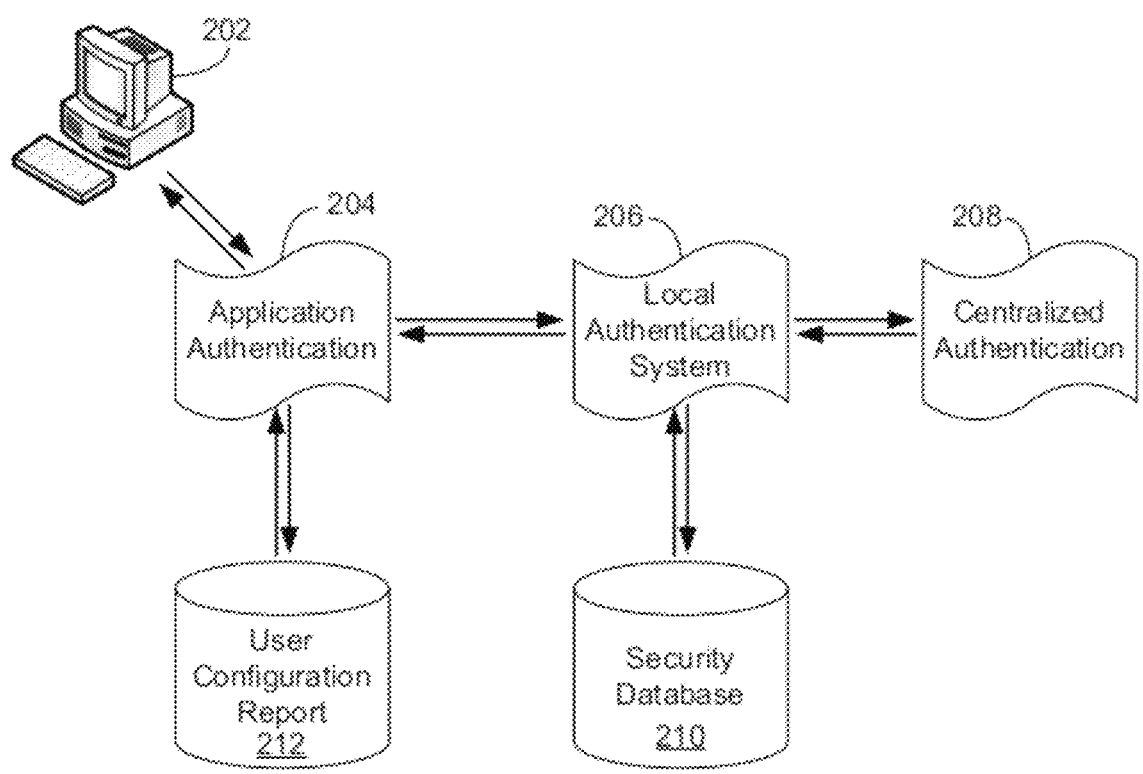
FIG. 2 illustrates a logical flow diagram for remote access to a domain including a server application and operating system containing heterogeneous authentication systems, according to a possible embodiment.
Figure 3:
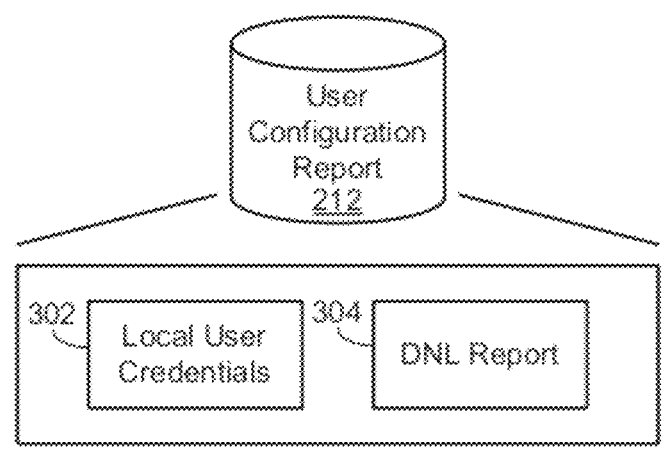
FIG. 3 illustrates example user configuration information in a local application useable within a system for authenticating a remote user across heterogeneous authentication systems, according to a possible embodiment of the present disclosure.

Referring now to FIG. 2, a logical flow diagram for a system 200 for remote access to a server application and operating system containing heterogeneous authentication systems is shown, according to a possible embodiment of the present disclosure. The illustration provided in FIG. 2 provides an example flow among authentication systems by which remote authentication can be accomplished using centralized authentication, for example in the system 100 of FIG. 1.

In the embodiment of system 200 shown, a remote client 202 is configured to transmit an authentication request from a remote system to a first authentication system 204. The first authentication system 204 can reside, for example, within an application requiring authentication, such as the Business Information Server for OS 2200 application mentioned above, which is provided by Unisys Corporation of Blue Bell, Pa. In the context of the present disclosure, the first authentication system 204 is referred to herein as a heterogeneous authentication system, in that the first authentication system 204 separately authenticates a user, and is not generally configured to authenticate that user based on use of a domain name or operating system login directly, for example where the authentication system 204 is required to provide access to resources in a system operating with a different heterogeneous authentication system, (e.g., authentication system 206).

In certain embodiments, the authentication request can include domain or network user credentials for authentication. Additionally, in certain embodiments the authentication request can include local authentication information, such as a local department or other static local information required for authentication or access control at the first authentication system 204 (e.g., information that will not change periodically such as a user's department, username, or other user credentials).

If the authentication request includes domain or network user credentials (e.g., as determined by presence of a backslash ('\') present in a username string) received from the remote client 202, the domain username and domain password can be routed from the first authentication system 204 to a second heterogeneous authentication system 206, for example to an interface provided in association with that system (e.g., interface 110 of FIG. 1). In addition, the first authentication system 204 can provide to the second heterogeneous authentication system 206 an identifier of a specific module to use for authentication, for example a number or other identifier of a module defined by the API 110 of FIG. 1 to describe an external (e.g., network or domain) authentication process. Example modules include an LDAP-compliant authentication module, a network authentication module, and an operating system-based authentication module.

In some embodiments, the second heterogeneous authentication system 206 is an authentication system incorporated into the Unisys OS 2200 operating system, provided by Unisys Corporation of Blue Bell, Pa. Other types of operating systems or authentication systems could be used as well.

A centralized authentication system 208 is configured to receive the domain user credentials from the second heterogeneous authentication system 206, for example to authenticate the domain user. The centralized authentication system 208 generally corresponds to directory authentication system 114, in that it is configured to provide a remote domain or network authentication service to the first and second systems 204, 206. In certain embodiments, the centralized authentication system 208 operates using the Active Directory service from Microsoft Corporation of Redmond, Wash. or some other similar centralized authentication system, and can provide LDAP-based or other domain-based or network-based authentication.

The centralized authentication system 208 is configured to return a confirmation of authorization of the user based on the domain user credentials, or a notification of a failed authorization. If a confirmation of authorization is returned, the second heterogeneous authentication system 206 then recognizes that the user is an authorized user within the domain, and transmits the domain username to a security database 210. The security database 210 is associated with the second heterogeneous authentication system 206, and includes associated local usernames and domain usernames (and optionally domain identifiers). The security database 210 provides in response to the domain username a local username that is used both by the second heterogeneous authentication system 206 and the first authentication system 204. The second heterogeneous authentication system 206 is configured to return the local username from the security database 210 to the first authentication system 202, which uses that local username, alongside any confirmation of authentication necessary to indicate to the first authentication system that the centralized authentication was successful. Since the first authentication system 202 then knows that the user has already been authenticated by the second heterogeneous authentication system 206, the local username is simply validated against any other information associated with that user account in a local database 212, for example identified department information received from the remote system 202.

Through use of this arrangement of authentication systems, a remote user can access an application or other software system associated with a first authentication system without that system having control over either a username or password of that remote user. Local username management can be controlled by a second heterogeneous authentication system 206 and passed to the first authentication system 204, and password authentication can occur in a centralized authentication system 208, allowing for network-level or domain-level user authentication. The second authentication system 206 will only provide the local username to the first authentication system 204 if it receives notification of authentication from the external authentication system 208, thereby controlling access to the software application associated with the first authentication system 204.

It is recognized that, in the context of the system 200, the external authentication system 208 implements authentication standards acceptable to the second heterogeneous authentication system 206, which in turn supplies credentials and is "trusted" to authenticate users on behalf of the first authentication system 204. The centralized authentication system 208 preferably implements a set of standards, including password strength, password update frequency, and optionally naming conventions that comply with those of the first and second authentication systems 204, 206, so that security is not weakened through remote access via domain-based authentication.

FIG. 3 illustrates example user configuration information in a local application useable within a system for authenticating a remote user across heterogeneous authentication systems, according to a possible embodiment of the present disclosure. In particular, the example user configuration information disclosed herein can be used in connection with the system of FIG. 2 to define access rights to an application associated with the first authentication system 204.

In the embodiment shown, the user configuration information can be stored in a local database 212, as illustrated in FIG. 2. The local database contains local user information 302 and a domain name login ("DNL") report 304. The local user information includes a listing of local usernames (e.g., usernames associated with and managed by either the first or second authentication systems 204, 206). The local user information 302 also optionally contains information used to define that user's access to information within the application associated with the authentication system 204. In some embodiments, that additional information can include an identifier of a department or departments associated with that user. Other information could be used as well.

The domain name login report 304 includes information regarding expected domain or network names that may be used for authentication, as well as optional default information for handling a login or authentication request defining an unknown domain name. When the first authentication system 204 detects a domain username received from a remote system (e.g., remote system 202 of FIG. 2), the domain name login report 304 is accessed to determine the manner in which authentication is to be accomplished. For example, the domain name login report 304 can include a correlation between specific domains and identifiers of various interface modules included in an authentication interface, such as API 110 of FIG. 1, that defines whether the authentication is to be performed, for example, at a separate heterogeneous authentication system (e.g., authentication system 206 of FIG. 2, or operating system authentication system 112 of FIG. 1), or at a centralized (e.g., network or domain name) authentication system, such as centralized authentication system 208 of FIG. 2 or domain authentication system 114 of FIG. 1. Other types of authentication modules could be used as well, to support various different types of authentication.

In addition to the local user information 302 and the domain name login report 304, additional information could be included in the local database 212. For example, the local database 212 can include additional files or tables correlating a local operating system username to an application username and department, thereby allowing the local operating system and application to operate using different naming conventions. Other types of information could be used as well.

Figure 4:
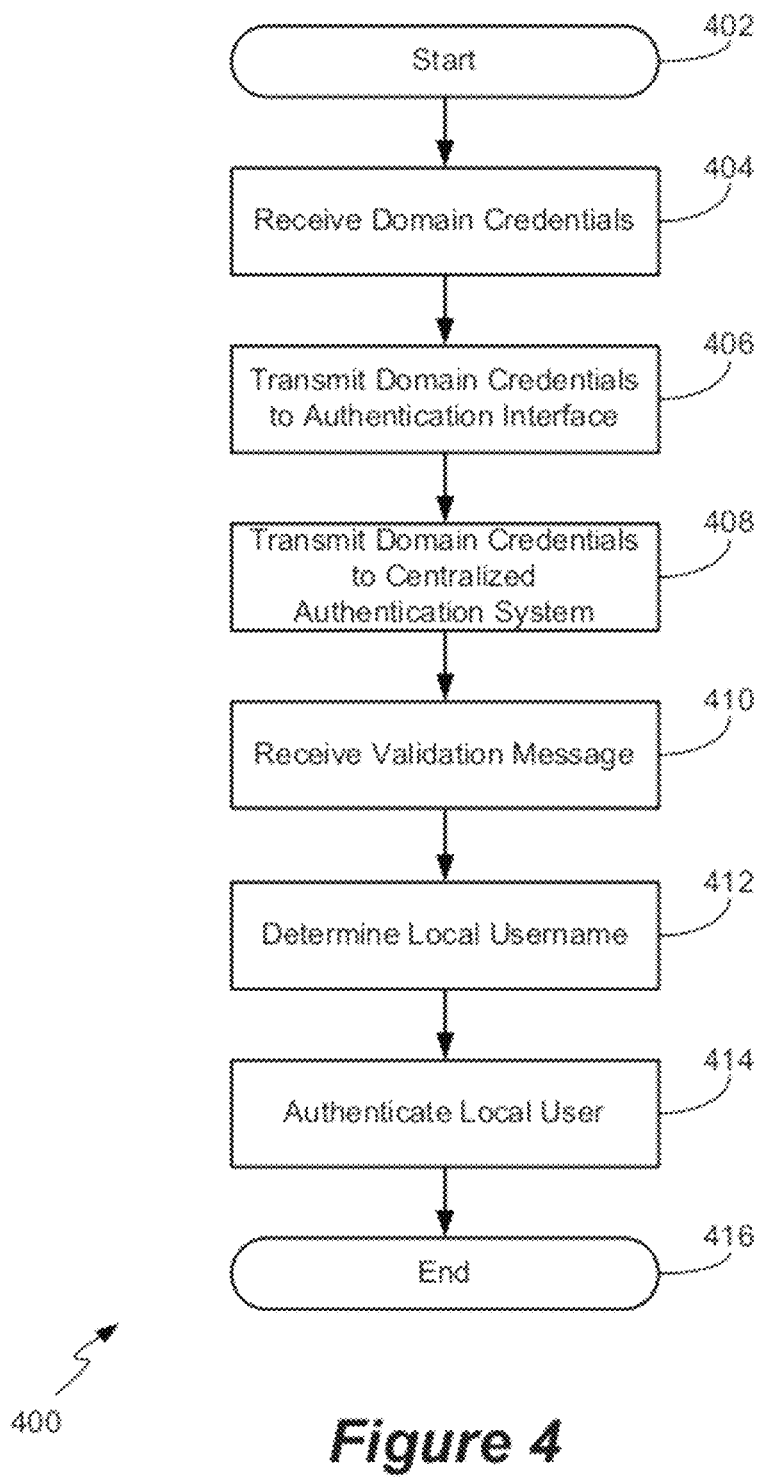
FIG. 4 illustrates a flowchart of a method for authenticating a remote user across heterogeneous authentication systems, according to a possible embodiment of the present disclosure.

FIG. 4 illustrates a flowchart of a method 400 for authenticating a remote user across heterogeneous authentication systems, according to a possible embodiment of the present disclosure. The method 400, as illustrated, operates within one or more embodiments of the systems described above with respect to FIGS. 1-3 to authenticate remote users across heterogeneous authentication systems. The method 400 allows a first authentication system, such as a system associated with a server application, to offload username and password management to a second authentication system associated with an operating system from which the server application requires resource access, and an authentication interface useable to provide centralized authentication.

The method 400 is instantiated at a start operation 402, which generally corresponds to an access attempt for accessing a server application or other process associated with a first authentication system. The method includes a credential receipt operation 404 in which domain user credentials (e.g., a domain username and a domain password) are received at a first authentication system. The first authentication system can be, for example a local authentication system associated with the server application being accessed by a remote user. Optionally, the credential receipt operation 404 further includes receipt of local information associated with the user, for example a department or other identifying characteristic of the user that defines that user's scope of rights within the local server application.

A transmission operation 406 corresponds to transmission of the domain user credentials from the first authentication system to a second authentication that is separate from, and separately managed from (i.e., is heterogeneous as compared to) the first authentication system. In some aspects, the second heterogeneous authentication system is an authentication system associated with an operating system within which the server application executes, or from which the server application requires access to resources (e.g., files or other data). The transmission operation 406 also optionally transmits an identifier of a particular module available in an authentication interface, for example to define the manner in which the domain user credentials are to be authenticated.

In certain embodiments, the second heterogeneous authentication system includes an authentication interface defining a number of modules to which the domain credentials are routed. An external transmission operation 408 transmits the domain user credentials from the second heterogeneous authentication system (optionally, from an identified interface module) to a centralized authentication system, such as an LDAP-based or domain-based authentication system.

An authentication receipt operation 410 corresponds to receipt of a confirmation message from the centralized authentication system indicating that the user identified by the domain user credentials is authenticated within the network or domain. A local authentication operation 412 transmits the domain username provided in the domain user credentials to a security database associated with the second heterogeneous authentication system, and receives in return a local username associated with the selected domain name and domain username that can be used for registration of the user within the systems associated with both the first and second authentication systems. In accordance with the present disclosure, it is recognized that each unique domain name and domain username is associated with a previously-established local username in the second heterogeneous authentication system (e.g., an operating system authentication system) for use with a local server application.

The local username is returned to the first authentication system, which registers the local user as authenticated at both the server application and operating system within which it is running (i.e., authenticated by both first and second heterogeneous authentication systems) at an authentication operation 414. Optionally, the department information received during the credential receipt operation 404 is used in connection with the local username to define a set of access rights to the server application. Additionally, optionally the server application can access username and department information specific to that server application, and correlate it to the local username, which in such cases represents a local operating system username. An end operation 416 corresponds to completed centralized (e.g., domain- or network-level) authentication of the remote user.

Figure 5:
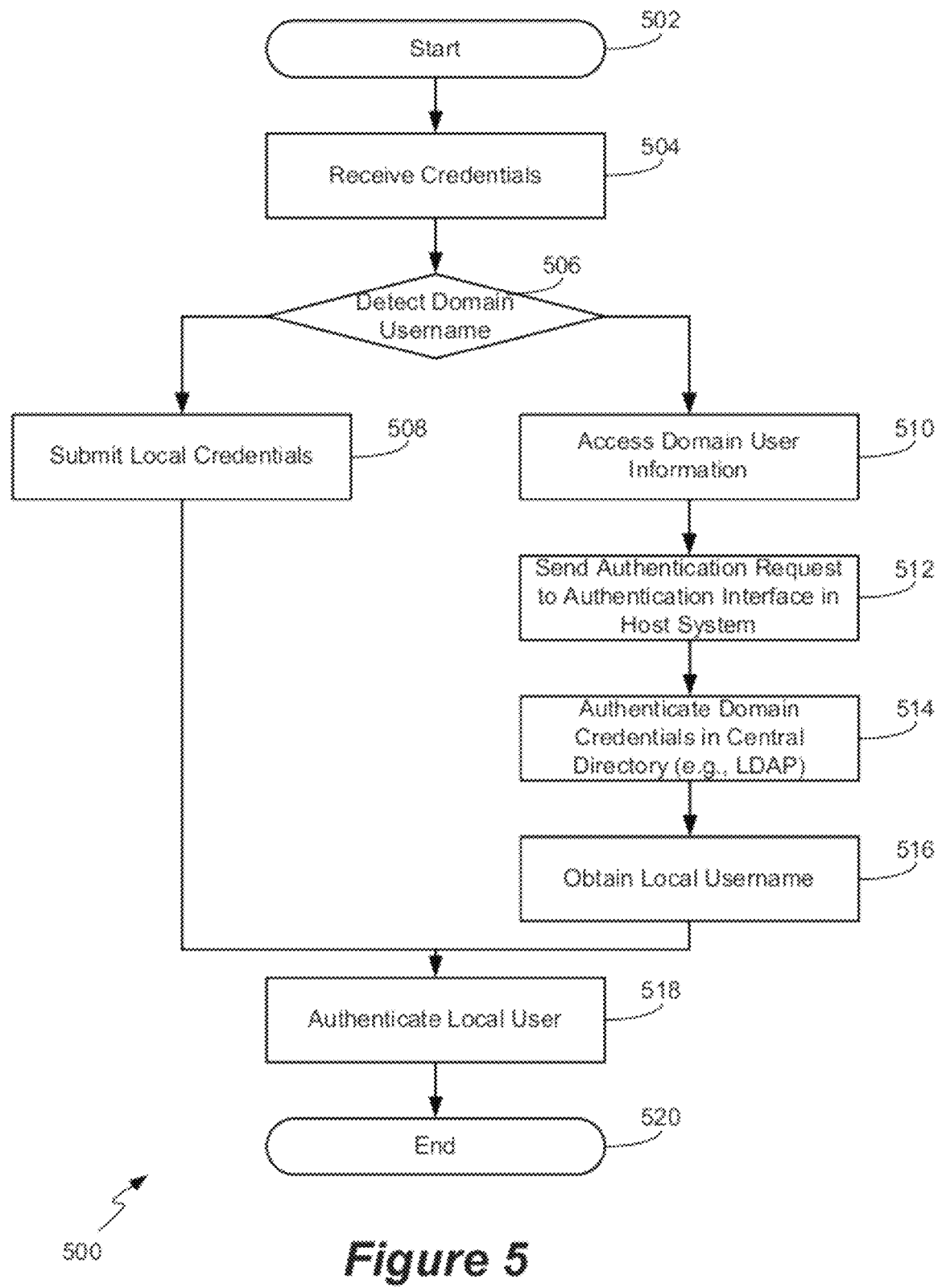
FIG. 5 illustrates a flowchart of a method for authenticating users in a local application, according to a possible embodiment.

Referring now to FIG. 5 a flowchart of a method 500 for authenticating users in a local application is shown, according to a possible embodiment of the present disclosure. The method 500 generally illustrates an example of an overall authentication process that can include the remote domain-based or network-based login methodology of FIG. 4, but can be used to adapt to circumstances where a user may or may not be at a remote location, and may wish to authenticate him or herself either locally or on a domain/network. Example systems within which the method 500 can be performed are described above in connection with FIGS. 1-3.

The method 500 generally is instantiated by a start operation 502, which generally corresponds to initiation of an authentication process by a user, such as a local or remote user of a server application executing within the context of an operating system. A credential receipt operation 504 generally corresponds to the credential receipt operation 404 of FIG. 4, in that it corresponds to receipt of user credentials at an authentication system. In the context of FIG. 5, the credential receipt operation 504 corresponds to receipt of a username and password, and optionally additional information required to log in to a server application remote from the user.

In accordance with the present disclosure, the username and password received during the credential receipt operation 504 can take a number of forms. In one example, if a user is defined as a domain user, that user will enter his/her domain username and domain password, which are predefined in a domain database. The user will, if remote from the server application, connect to the server application using a web-based portal or application-based program (e.g., a Java program). Analogously, a network name and password, LDAP-based name and password, or local username and password could be used. In some embodiments, the credential receipt operation 504 also receives local definition information, such as a local department associated with the user.

A domain username detection operation 506 determines whether the username received at the authentication system associated with the server application is a domain or network username. This can be accomplished, for example, by detecting the presence of a backslash ("\") character in the entered string associated with the username. If the username entered is not a domain or network username, a local login operation 508 submits the local username for authentication of the user with the server application, as well as with a local operating system within which the server application operates. It is assumed, in this case, that if the user has entered a local username, that same user will have provided a local password, which can be passed to the operating system for authentication as necessary.

If the username entered is a domain or network username, a domain user information operation 510 operating within the authentication system associated with the server application accesses information about the domain user, for example in a table associated with the DNL Report 304 of FIG. 3. This table specifies the specific module used by an authentication interface for authenticating the user. For example, a first module could be used for domain authentication, while a second module could be used for LDAP-based authentication, a third module could be used for another network authentication protocol/system, and a further module could be used for local authentication.

A transmission operation 512 sends the authentication request information to an identified authentication interface based on the results of reading the table defined by the DNL Report. For example, the transmission operation can transmit the name of the domain, as well as the user's domain username and password, to the identified interface defined by API 110 of FIG. 1.

An authentication operation 514 authenticates that user based on the information passed to the identified authentication interface module. The authentication operation 514 provides for domain or other centralized authentication according to any of a variety of authentication protocols, using the supplied domain username and password, and addressed to the identified domain. If the authentication is successful, a message is returned to the authentication interface module indicating successful authentication. If the authentication is unsuccessful, the authentication interface module receives a failure notification, which it returns to the remote user via the first authentication system associated with the server application.

Assuming a successful centralized authentication, a local username operation 516 corresponds to the authentication system associated with the operating system accessing the security database (e.g., security database 210 of FIG. 2) managed in the operating system to find a local username or user identifier. The local username or user identifier is associated with the network or domain username used by the authentication module in a listing or table in the security database containing local usernames or user identifiers and associated domain and domain username information. By performing a lookup of the domain and domain username information after obtaining the authentication message, the authentication system associated with the operating system can determine the local user that has been authenticated.

At this point, regardless of whether the user has provided local or domain authentication credentials, a local user authentication operation 518 can occur, and corresponds to validating a local username (either entered by the user and passed to the local authentication system by operation 508 or obtained from the security database by the local username operation 516) and department to the authentication system associated with the server application. Upon receipt of confirmation of successful authentication of that user, an end operation 520 corresponds to completed authentication of the user within the server application, the operating system hosting that server application, and optionally also within the domain or network defined by that user's entered authentication credentials. Optionally, the end operation 520 can include transmitting a confirmation message regarding authentication to a remote user, for example via a web or network application in which the user entered his/her credentials during the credential receipt operation 504.

Figure 6:
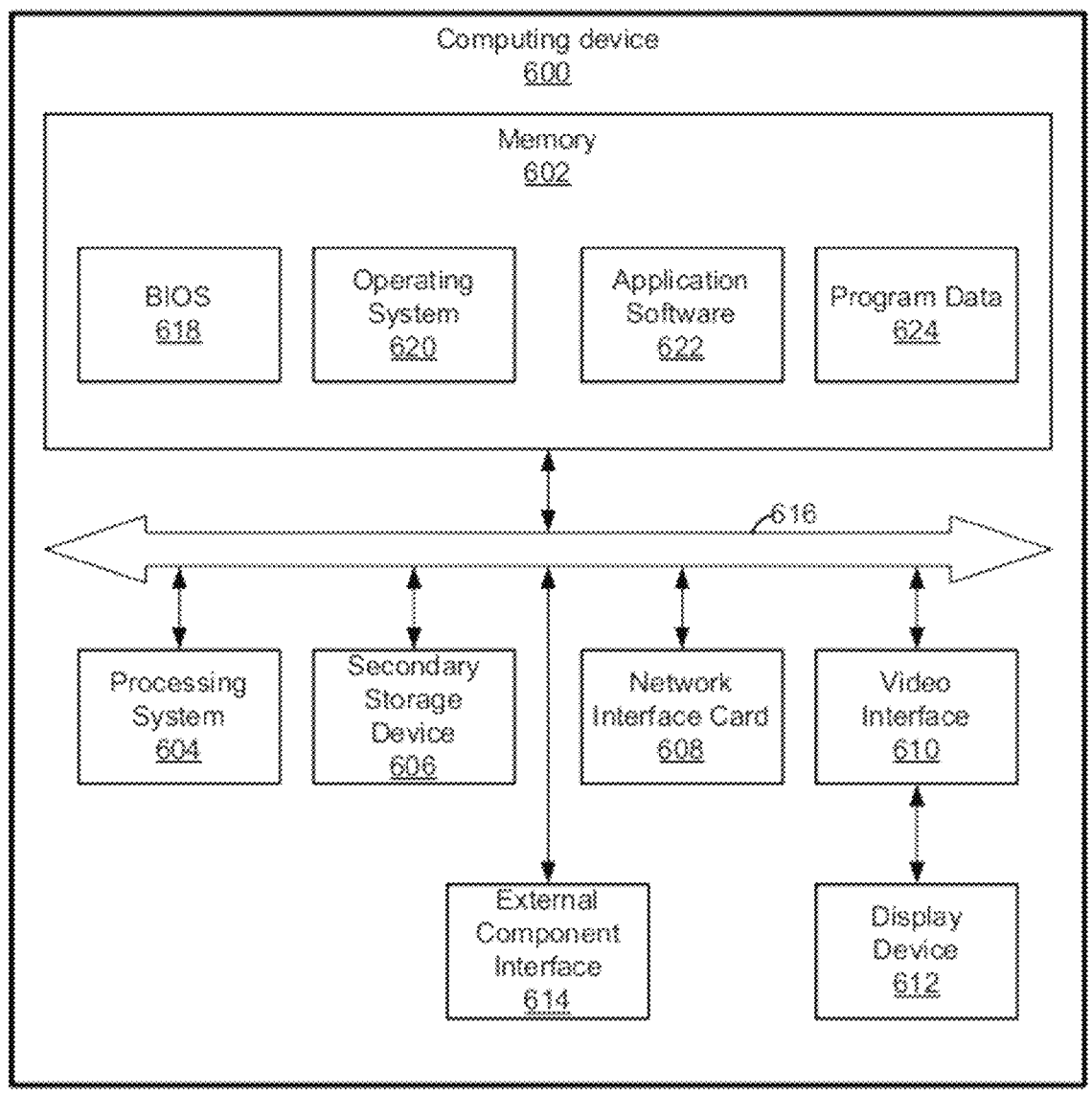
FIG. 6 is a block diagram illustrating example physical details of an electronic computing device, with which aspects of the present disclosure can be implemented.

FIG. 6 is a block diagram illustrating an example computing device 600, which can be used to implement aspects of the present disclosure, and upon which one or more of the server applications, operating systems, or authentication systems from FIGS. 1-5 can be executed and, one or more of the databases or data stores of FIGS. 1-5 can be stored.

In the example of FIG. 6, the computing device 600 includes a memory 602, a processing system 604, a secondary storage device 606, a network interface card 608, a video interface 610, a display unit 612, an external component interface 614, and a communication medium 616. The memory 602 includes one or more computer storage media capable of storing data and/or instructions. In different embodiments, the memory 602 is implemented in different ways. For example, the memory 602 can be implemented using various types of computer storage media.

The processing system 604 includes one or more processing units. A processing unit is a physical device or article of manufacture comprising one or more integrated circuits that selectively execute software instructions. In various embodiments, the processing system 604 is implemented in various ways. For example, the processing system 604 can be implemented as one or more processing cores. In another example, the processing system 604 can include one or more separate microprocessors. In yet another example embodiment, the processing system 604 can include an application-specific integrated circuit (ASIC) that provides specific functionality. In yet another example, the processing system 604 provides specific functionality by using an ASIC and by executing computer-executable instructions.

The secondary storage device 606 includes one or more computer storage media. The secondary storage device 606 stores data and software instructions not directly accessible by the processing system 604. In other words, the processing system 604 performs an I/O operation to retrieve data and/or software instructions from the secondary storage device 606. In various embodiments, the secondary storage device 606 includes various types of computer storage media. For example, the secondary storage device 606 can include one or more magnetic disks, magnetic tape drives, optical discs, solid state memory devices, and/or other types of computer storage media.

The network interface card 608 enables the computing device 600 to send data to and receive data from a communication network. In different embodiments, the network interface card 608 is implemented in different ways. For example, the network interface card 608 can be implemented as an Ethernet interface, a token-ring network interface, a fiber optic network interface, a wireless network interface (e.g., WiFi, WiMax, etc.), or another type of network interface.

The video interface 610 enables the computing device 600 to output video information to the display unit 612. The display unit 612 can be various types of devices for displaying video information, such as a cathode-ray tube display, an LCD display panel, a plasma screen display panel, a touch-sensitive display panel, an LED screen, or a projector. The video interface 610 can communicate with the display unit 612 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 614 enables the computing device 600 to communicate with external devices. For example, the external component interface 614 can be a USB interface, a FireWire interface, a serial port interface, a parallel port interface, a PS/2 interface, and/or another type of interface that enables the computing device 600 to communicate with external devices. In various embodiments, the external component interface 614 enables the computing device 600 to communicate with various external components, such as external storage devices, input devices, speakers, modems, media player docks, other computing devices, scanners, digital cameras, and fingerprint readers.

The communications medium 616 facilitates communication among the hardware components of the computing device 600. In the example of FIG. 6, the communications medium 616 facilitates communication among the memory 602, the processing system 604, the secondary storage device 606, the network interface card 608, the video interface 610, and the external component interface 614. The communications medium 616 can be implemented in various ways. For example, the communications medium 616 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618 and an operating system 620. The BIOS 618 includes a set of computer-executable instructions that, when executed by the processing system 604, cause the computing device 600 to boot up. The operating system 620 includes a set of computer-executable instructions that, when executed by the processing system 604, cause the computing device 600 to provide an operating system that coordinates the activities and sharing of resources of the computing device 600. Furthermore, the memory 602 stores application software 622. The application software 622 includes computer-executable instructions, that when executed by the processing system 604, cause the computing device 600 to provide one or more applications. The memory 602 also stores program data 624. The program data 624 is data used by programs that execute on the computing device 600.

The term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Overall, a number of advantages of the methods and systems of the present disclosure exist. For example, using domain names to log in to a local application would allow users with identical domain usernames (but residing in different domains) to log in to the local application through background assignment of unique local usernames. Furthermore, the methods and systems described herein remove the requirement of username and password management from an application's authentication system even in circumstances where that application requires access to operating system resources, thereby resolving a possible disconnect between systems when a user's passwords change and access across heterogeneous authentication systems is required. Using an interface to manage local or centralized login procedures allows support for standard authentication systems, including authentication using LDAP-based servers.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of authenticating a remote user across heterogeneous authentication systems, the method comprising:
receiving, from an application, user credentials at a first heterogeneous authentication system within the application;
determining whether the received user credentials correspond to a domain username or a local username;
when the received user credentials correspond to a local username, performing the steps of:
selecting a local API module implementing a local authentication system within the first heterogeneous authentication system;
using the local username to authenticate the user within the first heterogeneous authentication system; and
when the received user credentials correspond to a domain username, performing the steps of:
transmitting the domain user credentials from the first heterogeneous authentication system to an authentication interface associated with a second heterogeneous authentication system local to the first heterogeneous authentication system;
selecting one of a plurality of network API modules available within the authentication interface, the plurality of network API modules corresponding to a plurality of network-level authentication protocols;
transmitting the domain user credentials from the second heterogeneous authentication system and an identifier corresponding to the selected network API module to use for authentication to a centralized authentication system;
receiving at the authentication interface a validation message from the centralized authentication system, thereby authenticating the user;
upon receipt of the validation message, determining a local username at the authentication interface based on the domain user credentials; and
using the local username to authenticate the user within the first heterogeneous authentication system;
wherein the first heterogeneous authentication system corresponds to a component of a first computing system utilizing a first operating system and the second heterogeneous authentication system corresponds to a component of a second computing system utilizing a second operating system;
wherein the centralized authentication system is not part of the first heterogeneous authentication system; and
the first operating system and the second operating system correspond to different operating systems.

2. The method of claim wherein the centralized authentication system is a domain authentication system.

3. The method of claim 1, wherein the first heterogeneous authentication system comprises a local authentication system associated with a server application.

4. The method of claim 3, wherein the second heterogeneous authentication system comprises an operating system authentication system.

5. The method of claim 1, wherein the domain user credentials includes a domain username and a domain password.

6. The method of claim 1, further comprising receiving local login information at the first heterogeneous authentication system.

7. The method of claim 6, wherein receiving the local login information occurs concurrently with receiving the domain user credentials at the first heterogeneous authentication system.

8. The method of claim 1, wherein the local username is a username associated with the second heterogeneous authentication system.

9. A system for authenticating remote users across heterogeneous authentication systems, the system comprising:
a first heterogeneous authentication system configured to control access to a first server application on a server;
a second heterogeneous authentication system configured to control access to an operating system on a server, the server hosting the first server application; and
an authentication interface operable in connection with the second heterogeneous authentication system, the authentication interface configured to communicate with a centralized authentication system operating external to the server;
wherein the first heterogeneous authentication system lacks definition of the user credentials used to access the first server application;
wherein the first heterogeneous authentication system corresponds to a component of a first computing system utilizing a first operating system and the second heterogeneous authentication system corresponds to a component of a second computing system utilizing a second operating system;
wherein the centralized authentication system is not part of the first heterogeneous authentication system;
wherein the first operating system and the second operating system correspond to different operating systems; and
wherein the first heterogeneous authentication system is configured to perform the steps of:
receiving, from an application, user credentials;
determining whether the received user credentials correspond to a domain username or a local username;
when the received user credentials correspond to a local username, performing the steps of:
selecting a local API module implementing a local authentication system within the first heterogeneous authentication system;
using the local username to authenticate the user within the first heterogeneous authentication system; and
when the received user credentials correspond to a domain username, performing the steps of:
transmitting the domain user credentials from the first heterogeneous authentication system to an authentication interface associated with a second heterogeneous authentication system local to the first heterogeneous authentication system; and selecting one of a plurality of network API modules available within the authentication interface, the plurality of network API modules corresponding to a plurality of network-level authentication protocols;

wherein the second heterogeneous authentication system is configured to perform the step of transmitting the domain user credentials from the second heterogeneous authentication system and an identifier corresponding to the selected network API module to use for authentication to a centralized authentication system.

10. The system of claim 9, wherein the first heterogeneous authentication system comprises a portion of the first server application.

11. The system of claim 9, wherein the second heterogeneous authentication system comprises a portion of the operating system.

12. The system of claim 9, wherein the authentication interface is incorporated into the operating system.

13. The system of claim 9, wherein the centralized authentication system is an Active Directory authentication system.

14. The system of claim 9, wherein the first heterogeneous authentication system is configured to receive domain user credentials at a first heterogeneous authentication system and transmit the domain user credentials from the first heterogeneous authentication to an authentication interface associated with a second heterogeneous authentication system.

15. The system of claim 14, wherein the domain user credentials includes a domain username and a domain password.

16. The system of claim 9, wherein the external authentication interface defines an application programming interface configured for connection to the centralized authentication system.

17. The system of claim 9, further comprising a domain name logon table maintained in memory of the server.

18. A computer-implemented method of authenticating a remote user across heterogeneous authentication systems, the method comprising:

receiving, from a server application, user credentials and local login information at a local authentication system associated with the server application;

determining whether the received user credentials correspond to a domain username or a local username;

when the received user credentials correspond to a local username, performing the steps of:

selecting a local API module implementing a local authentication system within the first heterogeneous authentication system;

using the local username to authenticate the user within the first heterogeneous authentication system; and when the received user credentials correspond to a domain username, performing the steps of:

transmitting the domain user credentials from a local authentication system associated with a server application to an authentication interface associated with an operating system authentication system local to the first authentication system, the authentication interface including a plurality of network application programming interface modules configured to interface with a domain authentication system;

selecting one of a plurality of network API modules, the plurality of network API modules corresponding to a plurality of network-level authentication protocols;

transmitting the domain user credentials and an identifier corresponding to the selected network API module to use for authentication from the authentication interface to the domain authentication system;

receiving at the authentication interface a validation message from the domain authentication system;

upon receipt of the validation message, authenticating the domain user credentials at the operating system authentication system;

determining a local username at the authentication interface based on the domain user credentials; and using the local username and the local login information to authenticate the user within the local authentication system associated with the server application;

wherein the local authentication system corresponds to a component of a local computing system utilizing a first operating system and the authentication interface associated with an operating system authentication system corresponds to a component of a remote computing system utilizing a second operating system;

wherein the centralized authentication system is not part of the first heterogeneous authentication system; and wherein the first operating system and the second operating system correspond to different operating systems.

19. The method of claim 18, wherein the domain user credentials includes a domain username and a domain password.

20. The method of claim 18, wherein the first heterogeneous authentication system lacks definition of the user credentials used to access the first server application.

* * * * *